(12) United States Patent
Davies et al.

(10) Patent No.: US 10,217,466 B2
(45) Date of Patent: Feb. 26, 2019

(54) VOICE DATA COMPENSATION WITH MACHINE LEARNING

(71) Applicant: Cisco Technology, Inc., San Jose, CA (US)

(72) Inventors: Thomas J. Davies, Guildford (GB); Gabriel Bouvigne, Nanterre (FR); Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/497,650

(22) Filed: Apr. 26, 2017

(65) Prior Publication Data

US 2018/0315438 A1    Nov. 1, 2018

(51) Int. Cl.
*G10L 19/005* (2013.01)
*G10L 21/02* (2013.01)
(Continued)

(52) U.S. Cl.
CPC .......... *G10L 19/005* (2013.01); *G06N 99/005* (2013.01); *G10L 15/02* (2013.01);
(Continued)

(58) Field of Classification Search
CPC .................................................... G10L 19/005
See application file for complete search history.

(56) References Cited

U.S. PATENT DOCUMENTS 7,315,818 B2   1/2008  Stevens et al.
8,249,881 B2   8/2012  Roy
(Continued)

OTHER PUBLICATIONS

Kevin Jaffay, et al., "Readings in Multimedia Computing and Networking", Chapter 9, Networking and Media Streaming, Library of Congress Control No. 2001090720, ISBN 1-55860-651-3, Aug. 2001, 3 pages.

(Continued)

*Primary Examiner* — Douglas Godbold
(74) *Attorney, Agent, or Firm* — Edell, Shapiro & Finnan, LLC (57) ABSTRACT

A method comprises: obtaining, at an apparatus, first voice data from a first user device associated with a first speaker participant in a communication session; detecting voice data loss or degradation in the first voice data; determining whether prediction probability of correctly compensating for the voice data loss or degradation is greater than a predetermined probability threshold; if the prediction probability is greater than the predetermined probability threshold, first compensating for the voice data loss or degradation using historical voice data received by the apparatus prior to receiving of the first voice data, the first compensating producing first compensated voice data; if the prediction probability is not greater than the predetermined probability threshold, second compensating for the voice data loss or degradation by inserting noise to the first voice data to produce second compensated voice data; and outputting the first compensated voice data or the second compensated voice data.

20 Claims, 7 Drawing Sheets

(51) Int. Cl.
*G10L 15/02* (2006.01)
*G10L 25/60* (2013.01)
*G10L 21/028* (2013.01)
*G06N 99/00* (2019.01)

(52) U.S. Cl.
CPC ........ *G10L 21/0205* (2013.01); *G10L 21/028* (2013.01); *G10L 25/60* (2013.01); *G10L 2015/025* (2013.01)

(56) References Cited

U.S. PATENT DOCUMENTS

| | | | | |
|---|---|---|---|---|
| 8,515,748 | B2* | 8/2013 | Gangemi | G10L 13/00 704/235 |
| 9,305,546 | B2* | 4/2016 | Ljolje | G06F 17/27 |
| 2006/0173687 | A1* | 8/2006 | Spindola | G10L 19/005 704/265 |
| 2009/0240490 | A1* | 9/2009 | Kim | G10L 19/005 704/207 |
| 2010/0312553 | A1* | 12/2010 | Fang | G10L 19/005 704/226 |
| 2014/0222420 | A1* | 8/2014 | Su | G10L 19/005 704/201 |
| 2017/0013127 | A1 | 1/2017 | Xue et al. | |

OTHER PUBLICATIONS

Kathleen Jepson, et al., "Vowel Duration and Consonant Lengthening in Djambarrpuyngu", School of Languages and Linguistics, University of Melbourne, 2015, 5 pages.

Udhyakumar Nallasamy, et al., "Active Learning for Accent Adaption in Automatic Speech Recognition", 2012 IEEE Spoken Language Technology Workshop (SLT), Dec. 2-5, 2012, Miami, FL, DOI: 10.1109/SLT.2012.6424250, 6 pages.

David Odden, "The Representation of Vowel Length", OSU, The Blackwell companion to phonology, 2011, 30 pages.

Sebastian Anthony, "Adobe demos 'photoshop for audio,' lets you edit speech as easily as text", Ars Technica, https://arstechnica.com/information-technology/2016/11/adobe-voco-photoshop-for-audio-speech-editing/, last accessed Apr. 25, 2017, 3 pages.

Tino Haderlein, et al., "Intelligibility Rating with Automatic Speech Recognition, Prosodic, and Cepstral Evaluation", International Conference on Text, Speech and Dialogue, TSD 2011: Conference Paper, DOI: 10.1007/978-3-642-23538-2_25, 2 pages.

Daniel Felps, et al., "Developing objective measures of foreign-accent conversion", Department of Computer Science and Engineering, Texas A&M University, Technical Report tamu-cs-tr-2009-9-1, Sep. 2009, 29 pages.

Mako Ishida, et al., "Missing phonemes are perceptually restored but differently by native and non-native listeners", Ishida and Arai SpringerPlus (2016)5:713, DOI 10.1186/s40064-016-2479-8, 10 pages.

Bartosz Ziółko, et al., "The use of statistics of Polish phonemes in speech recognition", Speech signal annotation, processing and synthesis, Poznań 2006, 9 pages.

\* cited by examiner

VOICE DATA COMPENSATION WITH MACHINE LEARNING

TECHNICAL FIELD

The present disclosure relates to audio data compensation for intelligibility enhancement.

BACKGROUND

Internet-based communications sometimes experience voice dropouts caused by packet losses due to network congestion. This may result in users having difficulty in understanding the speech. Further, speech in video/audio conferencing may be unclear, due to audio data degradations cause by encoding and transmission, as well as problems created at the speaker's end, including poor diction, unfinished words, and/or poor enunciation. Moreover, a participant in a conference session may be speaking in a language with which the participant is unfamiliar or unconfident, and may have a heavy accent, making it difficult to understand by other participants in the conference session.

DESCRIPTION OF EXAMPLE EMBODIMENTS

Overview

In one embodiment, a method is provided in which first voice data from a first user device associated with a first speaker participant in a communication session is obtained either by a second user device or a server. The second user device or the server detects voice data loss or poor intelligibility (degradation) in the first voice data and determines whether prediction probability of correctly compensating for the voice data loss or degradation is greater than a predetermined probability threshold. If the prediction probability is greater than the predetermined probability threshold, the second user device or the server performs a first compensating for the voice data loss or degradation using historical voice data received by the second user device or the server prior to receiving of the first voice data, the first compensating producing first compensated voice data. If the prediction probability is not greater than the predetermined probability threshold, the second user device or the server performs a second compensating for the voice data loss or degradation by inserting noise to the first voice data to produce second compensated voice data. The second user device or the server outputs/transmits the first compensated voice data or the second compensated voice data.

Example Embodiments

Presented herein are an apparatus, system and method to improve intelligibility of speech in an on-line voice communication environment, e.g., conference session, Voice over Internet Protocol (VoIP) call, etc. among a plurality of conference or communication participants. A server or client device may detect voice data loss or degradation upon receiving voice data of audio and determine a proper method to compensate for the voice data loss or degradation in order to output compensated voice data to be presented to a receiving user. Further, before outputting the compensated voice data, a server or client device may determine whether the compensated voice data is intelligible/clear. If the compensated voice data is determined not to be intelligible/clear, the server or client device may replace the unintelligible portion of the voice data with substitute voice data, which may be one of a comparable counterpart of historical voice data corresponding to the portion of the voice data, synthesized voice data based on the historical voice data, idealized voice data, or a combination thereof.

Figure 1:
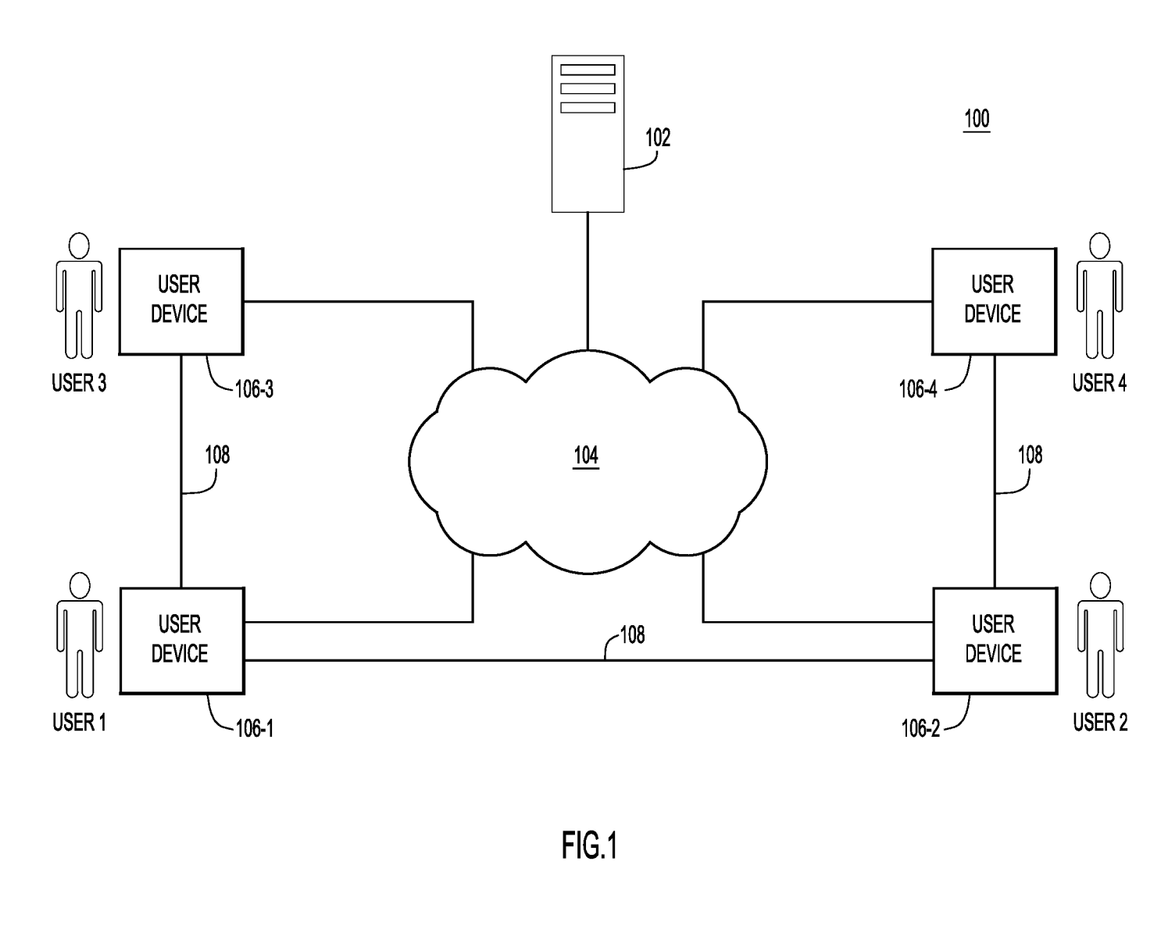
FIG. 1 depicts a communication system in which voice data loss or degradation may be compensated to improve speech intelligibility, according to an example embodiment

FIG. 1 depicts a communication system 100 in which voice data loss or degradation may be compensated to improve speech intelligibility, according to an example embodiment. The system 100 includes a server 102, one or more networks 104, and a plurality of user devices 106-1 to 106-4 (collectively 106). Although four user devices 106-1 to 106-4 are shown in FIG. 1, it is to be understood that more or less than four user devices may be present in the system 100. Each of the user devices 106 is associated with or used by a user, i.e., the user device 106-1 is associated with user 1; the user device 106-2 is associated with user 2; the user device 106-3 is associated with user 3; the user device 106-4 is associated with user 4. Each of the user devices 106 can communicate with each other directly (direct links 108) or through the network 104. For simplicity, some direct links among the user devices 106 are omitted in FIG. 1.

Figure 2:
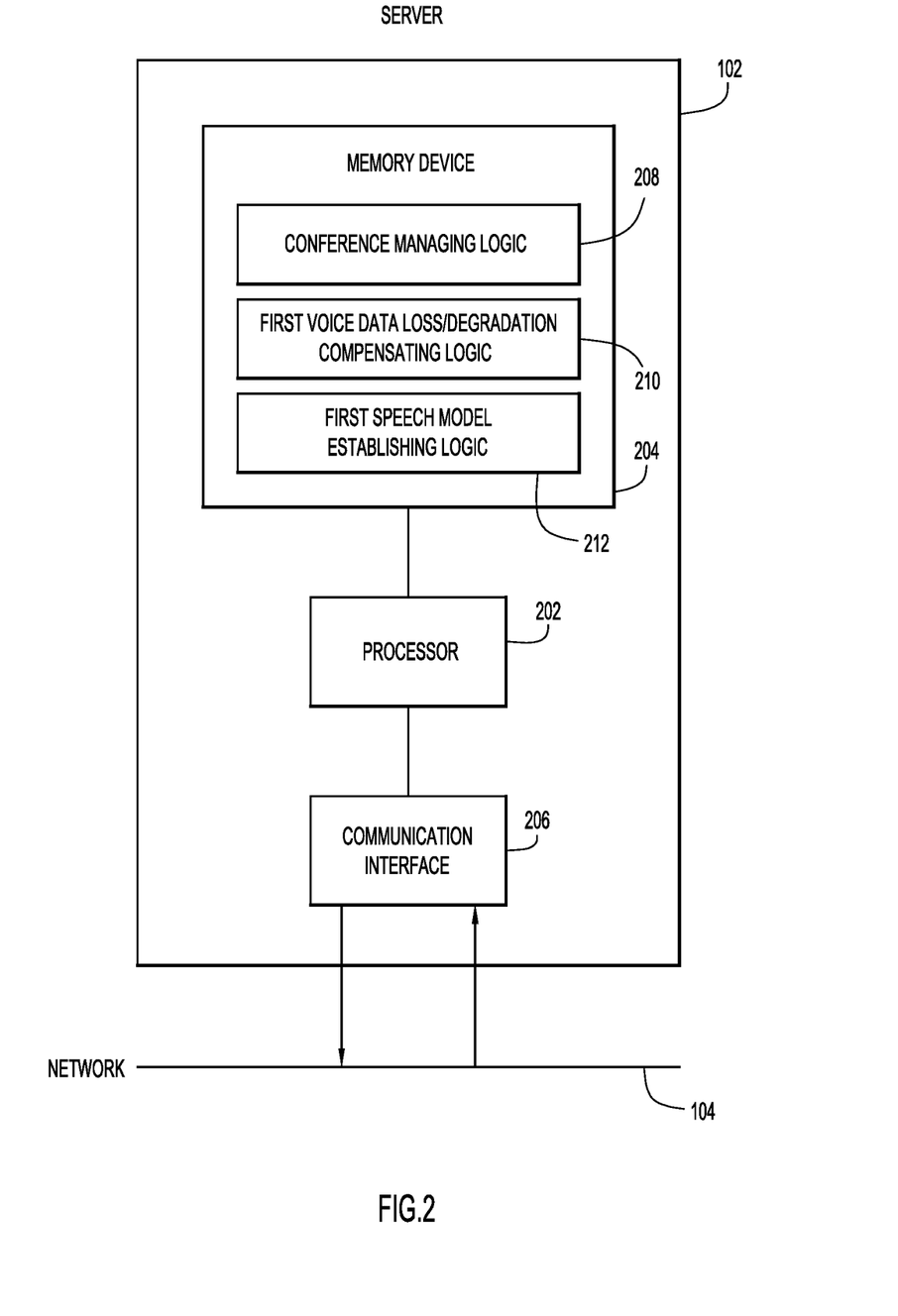
FIG. 2 is a block diagram of a server configured to compensate for voice data loss or degradation, according to an example embodiment.

FIG. 2 depicts a block diagram of the server 102 according to an example embodiment. The server 102 includes a processor 202, a memory 204, and a communication interface 206. The processor 202 may be a microprocessor or microcontroller (or multiple instances of such components) that is configured to execute program logic instructions (i.e., software) for carrying out various operations and tasks described herein. For example, the processor 202 is configured to execute instructions for conference managing logic 208 stored in the memory 204 to manage conferences among the user devices 106 including receiving data related to setting up an on-line conference, sending conference invitations to user devices 106, moderating conferences, etc. In one embodiment, the processor 202 is further configured to execute instructions for first voice data loss/degradation compensating logic 210 stored in the memory 204 to perform voice data compensation in the event there is a voice dropout (voice data loss) or degradation during a conference/communication session. Further, the processor 202 is configured to execute instructions for first speech model establishing logic 212 stored in the memory 204. The first speech model establishing logic 212 uses voice data of users/participants to train a learning process/machine in order to establish a speech model for each of the users or each of groups of users. Further descriptions of the operations performed by the processor 202 when executing instructions stored in the memory 204 will be provided below.

The memory 204 may include read only memory (ROM), random access memory (RAM), magnetic disk storage media devices, optical storage media devices, flash memory devices, electrical, optical or other physical/tangible memory storage devices.

The functions of the processor 202 may be implemented by logic encoded in one or more tangible (non-transitory) computer-readable storage media (e.g., embedded logic such as an application specific integrated circuit, digital signal processor instructions, software that is executed by a processor, etc.), wherein the memory 204 stores data used for the operations described herein and stores software or processor executable instructions that are executed to carry out the operations described herein.

The conference managing logic 208, the first voice data loss/degradation compensating logic 210, and the first speech model establishing logic 212 may take any of a variety of forms, so as to be encoded in one or more tangible/non-transitory computer readable memory media or storage device for execution, such as fixed logic or programmable logic (e.g., software/computer instructions executed by a processor), and the processor 202 may be an application specific integrated circuit (ASIC) that comprises fixed digital logic, or a combination thereof.

For example, the processor 202 may be embodied by digital logic gates in a fixed or programmable digital logic integrated circuit, which digital logic gates are configured to perform the conference managing logic 208, the first voice data loss/degradation compensating logic 210, and the first speech model establishing logic 212. In general, these logics may be embodied in one or more computer-readable storage media encoded with software comprising computer executable instructions and when the software is executed operable to perform the operations described herein.

The communication interface 206 is configured to transmit signals to or receive signals from the network(s) 104 for the server 102. In one example, the communication interface 206 is one or more network interface cards. For example, the communication interface 206 receives voice data from one or more of the user devices 106 and transmits the voice data or compensated voice data to a receiving user device. Likewise, the communication interface 206 may also receive conference data and transmit conference invitations to the user devices 106.

Figure 3:
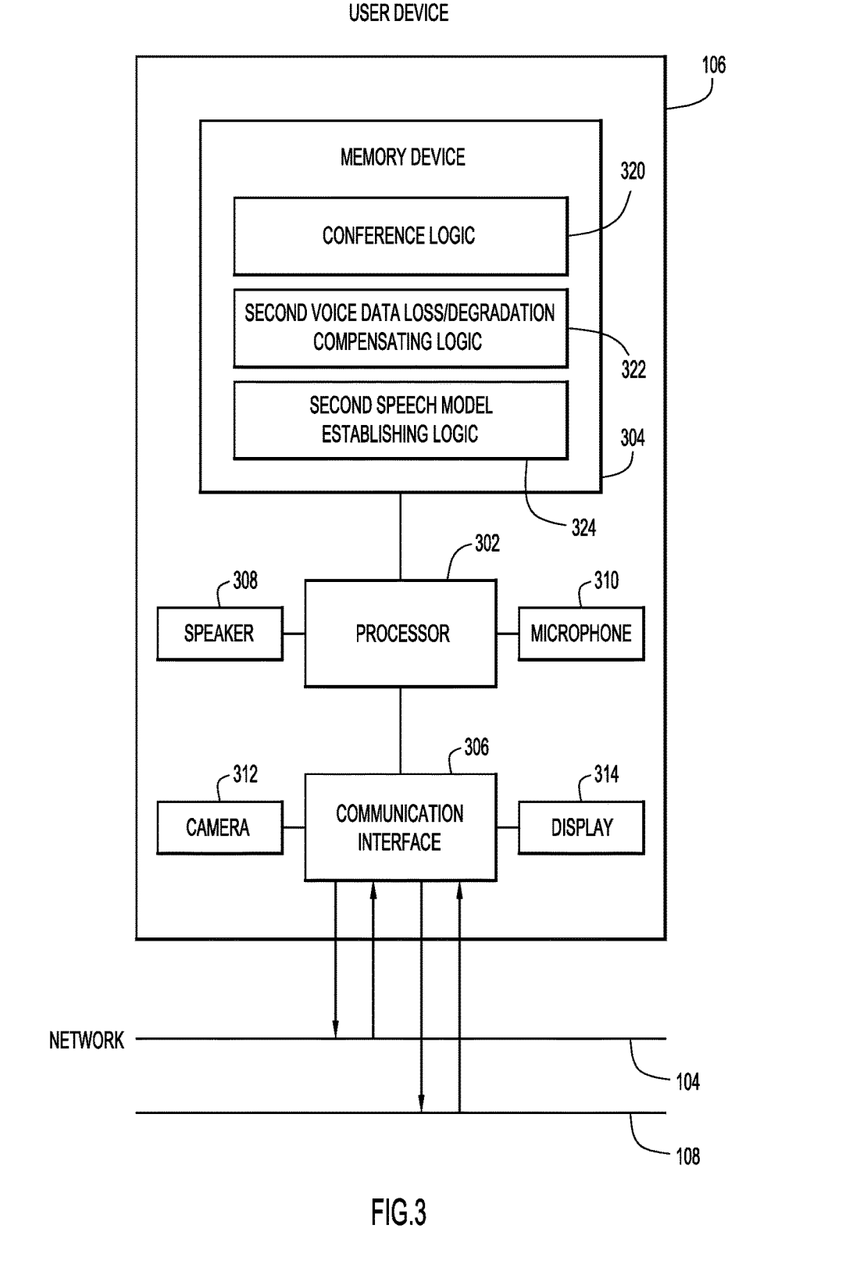
FIG. 3 is a block diagram of a user device configured to compensate for voice data loss or degradation, according to an example embodiment.

FIG. 3 depicts a block diagram of an example user device 106 according to an embodiment. The user device 106 may be any electronic devices that allows a user to participate in an audio communication session. For example, the user device 106 may be a desktop computer, a laptop computer, a mobile phone, a tablet, a personal data assistant (PDA), a digital camera, or in general any device that allows for at least audio communication. As shown in FIG. 3, the user device 106 includes a processor 302, a memory 304, a communication interface 306, a speaker 308, a microphone 310, a camera 312, and a display 314. The processor 302 is a microprocessor or microcontroller that is configured to execute program logic instructions (i.e., software) for carrying out various operations and tasks described in this disclosure. For example, the processor 302 is configured to execute instructions for conference logic 320 stored in the memory 304 to participate in an on-line conference with other user devices. In one embodiment, the processor 302 is further configured to execute instructions for second voice data loss/degradation compensating logic 322 stored in the memory 304 to perform voice data compensation in the event there is a voice dropout during an audio communication session. Further, the processor 302 is configured to execute instructions for second speech model establishing logic 324 stored in the memory 304. The second speech model establishing logic 324 uses voice data of users to train a learning process/machine to establish a speech model for each of the users or each of groups of users. Further description of the operations performed by the processor 302 executing instructions stored in the memory 304 will be provided below.

The memory 304 may include ROM, RAM, magnetic disk storage media devices, optical storage media devices, flash memory devices, electrical, optical or other physical/tangible memory storage devices.

The functions of the processor 302 may be implemented by logic encoded in one or more tangible (non-transitory) computer-readable storage media (e.g., embedded logic such as an application specific integrated circuit, digital signal processor instructions, software that is executed by a processor, etc.), wherein the memory 304 stores data used for the operations described herein and stores software or processor executable instructions that are executed to carry out the operations described herein.

The conference logic 320, the second voice data loss/degradation compensating logic 322, and the second speech model establishing logic 324 may take any of a variety of forms, so as to be encoded in one or more tangible/non-transitory computer readable memory media or storage device for execution, such as fixed logic or programmable logic (e.g., software/computer instructions executed by a processor), and the processor 302 may be an ASIC that comprises fixed digital logic, or a combination thereof.

For example, the processor 302 may be embodied by digital logic gates in a fixed or programmable digital logic integrated circuit, which digital logic gates are configured to perform the conference logic 320, the second voice data loss/degradation compensating logic 322, and the second speech model establishing logic 324. In general, these logics may be embodied in one or more computer-readable storage media encoded with software comprising computer executable instructions and when the software is executed operable to perform the operations described herein.

The communication interface 306 is configured to transmit signals to or receive signals from the network(s) 104 for the user device 106. Likewise, communication interface 306 is configured to transmit signals to or receive signals from direct links 108 for the user device 106. For example, the communication interface 306 receives voice data from the server 102 sent by one or more of the user devices 106 and transmits the voice data of an associated user to a receiving user device or the server 102. In one embodiment, the communication interface 306 is configured to receive compensated voice data from the server 102. The communication interface 306 may also receive a conference invitation from the server 102 or one of the user devices 106.

The speaker 308 is coupled to processor 302 and configured to reproduce voice data or compensated voice data for a user associated with the user device 106 during a communication session. The microphone 310 is coupled to processor 302 and configured to collect voice uttered by a user associated with the user device 106 during a communication session. The camera 312 is coupled to processor 302 and configured to capture images during a communication session. The display 314 is coupled to processor 302 and configured to display images or data, such as presentation materials used in an on-line conference. It is to be understood that there may be one or more additional processing ASICs connected between the speaker, camera, microphone and/or display and the processor 302 to facilitate the respective functions of those components and interaction with the processor 302. Those processing ASICs are omitted in FIG. 3 for simplicity.

With reference to FIGS. 1-3, techniques presented herein improve user experience in a communication session, such as an on-line conference, by detecting voice data loss/degradation and providing compensated voice data during the communication session. Embodiments provided below use an on-line conference as an example to explain operations to improve the above-mentioned user experience. It is to be understood that these techniques can be applied to other communication sessions and are not limited to on-line conferencing.

Referring to FIG. 1, user 1 associated with user device 106-1 desires to call for an on-line meeting with the users 2 to 4. The user 1 employs user device 106-1 to send meeting information to the server 102, which then sends out meeting invitations to other user devices 106-2 to 106-4. In one embodiment, user device 106-1 may send the meeting invitation to user devices 106-2 to 106-4 and the server 102 to involve server 102 to moderate the proposed meeting. When the meeting starts, the server 102 uses its processor 202 to execute the conference managing logic 208 to moderate the meeting among the user devices 106-1 to 106-4.

For example, user 1 speaks to a microphone (310) of the user device 106-1, which collects the user's speech as voice data. The processor 302 of the user device 106-1 then uses communication interface 306 to forward the voice data to the server 102. The server 102 in turn forwards the voice data for user 1 to user devices 106-2 to 106-4. When the server 102 receives a piece of voice data, the server 102 employs the first voice data loss/degradation compensating logic 210 stored in memory 204 to determine the language spoken in the voice data and determine whether there is voice data loss/degradation in the received voice data. If the server 102 detects that there is no voice data loss/degradation in the received voice data, the server 102 may store the voice data in memory 204 as historical voice data for the meeting session, thereby maintaining a history of conversations from user 1, user 2, user 3 and user 4 in the meeting.

The server 102 may also employ the first speech model establishing logic 212 to establish a speech model for each of the user 1-user 4, to produce individual speech models, or a group speech model for these users as a group. Specifically, the server 102 uses the received voice data that has no voice data loss/degradation to train a learning process to establish a speech model. The speech model may include a dictionary of vocabulary (a sequence of phonemes) that a particular user or group of users frequently uses. A person usually uses a limited number of words or expressions. A group of users gathering together to discuss a topic often uses a limited number of words or expressions for the topic. Based on this tendency, the learning process/machine can learn these words and expressions in order to facilitate the recognition of a missing phoneme or word in the received voice data. This technique allows for optimum recognition for a speaker of the voice data and minimizes false prediction of a missing phoneme or word. The speech model may also include vocabulary statistics/frequency of the words used by a user or a group of users. Generally, groups and larger entities (groups of groups) often share common language and expressions, which may or may not be understood by a conference server 102, but can be stored as vocabulary of sequences of phonemes. Identifying a user or a group of users allows the server 102 to identify a vocabulary, which can be represented as a graph of vocabularies starting at a user and then going through various group structures to which the user belongs. Further, the vocabulary can be a primary source for the rapid phoneme prediction to instantly fill the voice dropouts in the speech. In particular, diphones and triphones transitions in a given language can be accurately predicted through statistics.

In some embodiments, the server 102 may couple meeting agenda information and a list of meeting participants to a speech model for a user or a group of users in the meeting such that the server 102 may promptly identify a speech model for a current meeting based on a prior meeting records or prepare a speech model for a next meeting involving the user or the group of users.

A dictionary of vocabulary that a particular user or group or users uses can also be drawn from content presented in a communication session, such as slides and documents, and from a search on the Internet/World Wide Web based on the presentation content. These operations can be performed before the communication session begins once the presentation content is uploaded. Further, a dictionary of vocabulary can be expanded by importing live information during the communication session (e.g., a linked Etherpad or a chat room).

In one embodiment, the server 102 may also recognize the voice data, e.g., converting the voice data to phonemes or text to produce a speech transcription. The server 102 may store the speech models and speech transcriptions as a part of historical voice data in the memory 204.

If the server 102 detects that there is voice data loss/degradation in the received voice data, the server 102 further determines whether it can correctly predict a phoneme(s) or word(s) for the voice data loss/degradation. For example, the server 102 determines whether prediction probability of correctly compensating for the voice data loss/degradation is greater than a predetermined probability threshold. To do so, the server 102 may first recognize the speaker of the received voice data by, for example, identifying the user device that sends the voice data and is associated with a particular user. The server 102 may also compare the voice pattern in the received voice data with prior stored voice patterns of users to identify the speaker of the voice data. In one embodiment, the server 102 may train the learning process/machine to recognize voice patterns of the users and use the learning process/machine to identify the speaker of the received voice data based on its voice pattern.

The server 102 may employ the trained learning process to predict a missing phoneme(s) or word(s) based on the identification of the speaker, and find a frequency of the predicted phoneme(s) or word(s) occurring in prior voice data stored in memory 204. For example, the server 102 can determine that the predetermined probability threshold is five times the predicted phoneme(s) or word(s) occurring in prior voice data. When the predicted phoneme(s) or word(s) occurs in the stored historical voice data more than five times, the server 102 can determine that prediction probability of correctly compensating for the voice data loss/degradation is greater than the predetermined probability threshold. In another example, the received voice data may include many voice dropouts. The predetermined probability threshold may be set to be less than three dropouts per period of time, e.g., one second, in a voice data. When the received voice data includes three or more dropouts per second, the server 102 determines that a prediction probability of correctly compensating for the voice data loss/degradation is not greater than a predetermined probability threshold. Other parameters that can be used to set up a predetermined probability threshold include frequencies of phonemes or words uttered in last period of time (e.g., five minutes) by the speaker or a group of users including the speaker, words in materials that are used in the meeting (e.g., presentation slides, documents etc.), words in the meeting invitations, topics of the meeting, etc. The predetermined probability thresholds explained above are examples and should not be used to limit the scope of this disclosure.

If the server 102 determines that the prediction probability of correctly compensating for the voice data loss/degradation is not greater than a predetermined probability threshold, the server 102 employs the first voice data loss/degradation compensating logic 210 (FIG. 2) to compensate for the voice data loss/degradation by inserting noise, e.g., pink noise, to the received voice data to produce compensated voice data. If the server 102 determines that the prediction probability of correctly compensating for the voice data loss/degradation is greater than a predetermined probability threshold, the server 102 compensates for the voice data loss/degradation using historical voice data received by the server 102 prior to receiving of the current voice data that has voice data loss/degradation to produce compensated voice data. In one embodiment, to use the historical voice data in order to compensate for the voice data loss/degradation, the server 102 determines whether a predicted phoneme or word for the voice data loss/degradation in the received voice data matches a phoneme or a word in the historical voice data. For example, the server 102 compares the predicted phoneme or word with a dictionary of vocabulary including phonemes constructed using historical voice history for a user or a group of users. If the predicted phoneme or word matches a phoneme or a word in the historical voice data, the server 102 restores the voice data loss/degradation with the phoneme or the word in the historical voice data. If the predicted phoneme or word does not match a phoneme or a word in the historical voice data, the server 102 synthesizes voice data based on the historical voice data for the voice data loss/degradation.

In one embodiment, the server 102 may identify the speaker of the received voice data, and identify a portion of the historical voice data, e.g., the most recent historical voice data of the speaker that may be in the same meeting session or a prior meeting session, related to the speaker for compensating the voice data loss/degradation. In another embodiment, if the predicted word for the voice data loss/degradation has not been uttered by the identified speaker and thus cannot be found in the historical voice data, the server 102 can identify a second speaker(s) in the meeting with the speaker of the received voice data. That is, the server can identify a second speaker(s) based on the identification of the first speaker of the received voice data. The server 102 then identifies a portion of the historical voice data of the second speaker(s) and determines whether the predicted word for the voice data loss/degradation matches a word in the portion of the historical voice data of the second speaker(s). Because the second speaker(s) is in a meeting with the speaker of the received voice data, it may be likely that the predicted word may have been uttered by other participants in the meeting discussing the same topic. In one embodiment, identifying the second speaker(s) is based on data, such as conference invitations or materials shared in the conference, related to the meeting/conference session that includes the speaker of the received voice data and the second speaker(s).

Once the server 102 produces the compensated voice data, either by inserting noise to the received voice data or using historical voice data for the speaker of the received voice data, the server 102 outputs the compensated voice data to receiving/destination user devices. A user device that receives the compensated voice data then presents the compensated voice data via a speaker to a user. The compensated voice data is more intelligible and improves the listener's experience because the voice dropout is less noticeable.

In some embodiments, after the server 102 produces, but before it sends the compensated voice data, to the receiving/destination user device, the server 102 determines whether intelligibility of the compensated voice data is greater than an intelligibility threshold. If the intelligibility of the compensated voice data is greater than the intelligibility threshold, the server 102 releases the compensated voice data for transmission to the receiving/destination user device. However, if the intelligibility of the compensated voice data is not greater than the intelligibility threshold, the server 102 replaces at least a portion of the compensated voice data with substitute voice data.

For example, the server 102 may maintain a database storing idealized voice data (phonemes or words). The idealized voice data may include phonemes or words pronounced by a native speaker of a language in a clear manner that is acceptable by most of the listeners who speak the language. In some embodiments, the idealized voice data may take geographical locality into account (i.e., accent or speech idioms in a local area). The server 102 may compare the compensated voice data with the idealized voice data to rate the compensated voice data. If the rating of the compensated voice data is greater than an intelligibility threshold, the server 102 releases the compensated voice data. If the rating of the compensated voice data is not greater than an intelligibility threshold, the server 102 replaces a portion of the compensated voice data with substitute voice data to improve its intelligibility. For example, the substitute voice data includes one of a comparable counterpart of the historical voice data (e.g., recorded from previous instances from the same speaker) corresponding to the portion of the compensated voice data, synthesized voice data based on the historical voice data (e.g., generated from a model of the individual speaker's vocal production), the idealized voice data (e.g., generated from a model of idealized vocal production for that individual or in general), or a combination thereof. In one embodiment, a portion of the compensated voice data is replaced with substitute voice data to improve its intelligibility in real-time, e.g., a latency being less than a hundred milliseconds, or tens of milliseconds. The server 102 can modify only less intelligible elements. Alternatively, all speech from a speaker could be modified by combining with idealized audio/voice data.

In some embodiments, a voice communication session among a plurality of users (through their associated user devices 106) may or may not involve the server 102. In case the server 102 is not involved in the communication session or that the server 102 does not support voice data loss/degradation compensation, each of the user devices 106-1 to 106-4 may employ its own voice data compensating logic 322 and speech model establishing logic 324 to compensate for voice data loss/degradation in voice data it receives from other user devices in a manner similar to those explained above with respect to the server 102.

Specifically, for example, user 1 starts an audio communication session by speaking to a microphone (310) of the user device 106-1, which collects the user's speech as voice data. The processor 302 of the user device 106-1 then uses communication interface 306 to forward the voice data to a receiving/destination user device, for example, user device 106-2. In one embodiment, the voice data is also forwarded to the server 102 in parallel. The server 102, although it does not support a voice data loss/degradation compensation scheme, may recognize the voice data, e.g., converting the voice data to phonemes or text to produce a phonemic transcription and sends the speech transcription to a receiving/destination user device, such as user device 106-2. When the receiving user device 106-2 receives the voice data, the user device 106-2 employs the second voice data loss/degradation compensating logic 322 stored in the memory 304 to determine the language spoken in the received voice data and determine whether there is voice data loss/degradation in the received voice data.

If the user device 106-2 detects that no voice data loss/degradation is in the received voice data, the user device 106-2 may store the voice data in memory 304 as historical voice data for the meeting session with user 1. Thus, the user device 106-2 may store a history of conversations of user 1, user 3, and user 4 during the meeting. The user device 106-2 may also employ the second speech model establishing logic 324 to establish a speech model for each of the user 1, user 3, and user 4, which produces individual speech models, or for these users as a group, which produces a group speech model. Specifically, the user device 106-2 uses the received voice data that have no voice data loss/degradation to train a learning process/machine to establish a speech model. The speech model may include a dictionary of vocabulary (a sequence of phonemes) that a particular user or group or users frequently uses. In one embodiment, if the processing capability of the processor 302 and/or the storage capacity of memory 304 is limited, a small speech model and/or historical voice data may be stored in the user device 106-2. For example, the user device 106-2 may store the most recent speech model and/or historical voice data or those of the current meeting in the memory 304.

If the user device 106-2 detects that there is voice data loss/degradation in the received voice data, the user device 106-2 further determines whether it receives a phonemic transcription for the received voice data from the server 102. In one embodiment, the user device 106-2 may produce a phonemic transcription for the voice data. If the user device 106-2 has the phonemic transcription for the voice data, the user device 106-2 may compensate for the voice data loss/degradation using historical voice data received by the user device 106-2 prior to receiving of the received voice data.

On the other hand, if the user device 106-2 does not have the phonemic transcription for the voice data, the user device 106-2 may determine whether it can correctly predict a phoneme(s) or word(s) for the voice data loss/degradation. For example, the user device 106-2 determines whether prediction probability of correctly compensating for the voice data loss/degradation is greater than a predetermined probability threshold. The user device 106-2 may first recognize the speaker of the received voice data by, for example, identifying the user device that sends the voice data and is associated with a particular user. The user device 106-2 may also compare the voice pattern in the received voice data with prior stored voice patterns of users to identify the speaker of the voice data. In one embodiment, the user device 106-2 may train a learning process/machine of the second speech model establishing logic 324 to recognize voice patterns of the users and use the learning process/machine to identify the speaker of the received voice data based on the voice pattern.

The user device 106-2 may employ the trained learning process to predict a missing phoneme(s) or word(s) based on the identification of the speaker, and find a frequency of the predicted phoneme(s) or word(s) occurring in the historical voice data stored in memory 304. For example, the user device 106-2 can determined that the predetermined probability threshold is five times/occasions a phoneme or word showing up in the historical voice data. When the predicted phoneme(s) or word(s) shows up in the stored historical voice data more than five times, the user device 106-2 can determine that prediction probability of correctly compensating for the voice data loss/degradation is greater than the predetermined probability threshold. In another example, the received voice data may include a plurality of voice dropouts. The predetermined probability threshold may be set as less than two dropouts per period of time, e.g., one second, in a voice data. When the received voice data includes two or more dropouts per second, the user device 106-2 determines that the prediction probability of correctly compensating for the voice data loss/degradation is not greater than a predetermined probability threshold. Other parameters that can be used to set up a predetermined probability threshold include frequencies of phonemes or words uttered in last period of time (e.g., five minutes) by the speaker or a group of users including the speaker, words in materials that are shared in the meeting (e.g., presentation slides, documents, etc.), words in the meeting invitations, topics of the meeting, etc. The predetermined probability thresholds listed above are mere examples and should not be used to limit the scope of this disclosure.

If the user device 106-2 determines that the prediction probability of correctly compensating for the voice data loss/degradation is not greater than a predetermined probability threshold, the user device 106-2 employs the second voice data loss/degradation compensating logic 322 to compensate for the voice data loss/degradation by inserting noise, e.g., pink noise, to the received voice data to produce compensated voice data. If the user device 106-2 determines that the prediction probability of correctly compensating for the voice data loss/degradation is greater than a predetermined probability threshold, the user device 106-2 compensates for the voice data loss/degradation using historical voice data to produce compensated voice data. In one embodiment, to use the historical voice data to compensate for the voice data loss/degradation, the user device 106-2 determines whether a predicted phoneme or word for the voice data loss/degradation in the received voice data matches a phoneme or a word in the historical voice data. For example, the user device 106-2 compares the predicted phoneme or word with a dictionary of vocabulary including phonemes constructed using historical voice history for a user or a group of users. If the predicted phoneme or word matches a phoneme or a word in the historical voice data, the user device 106-2 restores the voice data loss/degradation with the phoneme or the word in the historical voice data. If the predicted phoneme or word does not match a phoneme or a word in the historical voice data, the server 102 synthesizes voice data based on the historical voice data for the voice data loss/degradation.

In one embodiment, the user device 106-2 may identify the speaker (for example, user 1) of the received voice data, and identify a portion of the historical voice data related to the speaker for compensating for the voice data loss/degradation. The portion of the historical voice data can be, for example, the most recent historical voice data of the user 1 that is produced in the same meeting session or a prior meeting session. In another embodiment, if the predicted word for the voice data loss/degradation has not been uttered by the user 1 and thus cannot be found in the historical voice data, the user device 106-2 can identify a second speaker(s), e.g., user 3 or 4, in the meeting with the user 1. That is, the user device 106-2 can identify a second speaker(s) based on the identification of the first speaker of the received voice data. The user device 106-2 then identifies a portion of the historical voice data of the second speaker(s) and determines whether the predicted phoneme or word for the voice data loss/degradation matches a phoneme or word in the portion of the historical voice data of the second speaker(s). Because the second speaker(s) is in meeting with the speaker of the received voice data, it is likely that the predicted word may have been uttered by other members in the meeting discussing the same topic. In one embodiment, identifying the speaker of the received voice data and/or identifying the second speaker(s) are based on data related to the meeting/conference session, such as conference invitations or materials shared in the conference.

Once the user device 106-2 produces the compensated voice data, either by inserting noise to the received voice data or by using historical voice data for the speaker of the received voice data, the user device 106-2 outputs the compensated voice data to a speaker (308), which reproduces the compensated voice data for a user. The compensated voice data is more intelligible and improves the listener's experience because the voice dropout(s) is compensated and less noticeable.

In some embodiments, after the user device 106-2 produces, but before it outputs the compensated voice data to the speaker 308, the user device 106-2 determines whether the compensated voice data is intelligible. For example, the user device 106-2 determines whether intelligibility of the compensated voice data is greater than an intelligibility threshold. If the intelligibility of the compensated voice data is greater than the intelligibility threshold, the user device 106-2 releases the compensated voice data to the speaker 308. However, if the intelligibility of the compensated voice data is not greater than the intelligibility threshold, the user device 106-2 replaces at least a portion of the compensated voice data with substitute voice data.

For example, the user device 106-2 may maintain a database storing idealized voice data (phonemes and/or words). The user device 106-2 may compare the compensated voice data with the idealized voice data to rate the compensated voice data. If the rating of the compensated voice data is greater than the intelligibility threshold, the user device 106-2 releases the compensated voice data. If the rating of the compensated voice data is not greater than the intelligibility threshold, the user device 106-2 replaces a portion of the compensated voice data with substitute voice data to improve its intelligibility. For example, the substitute voice data includes one of a comparable counterpart of the historical voice data corresponding to the portion of the compensated voice data, synthesis voice data based on the historical voice data, or idealized voice data.

As described above, the voice data can be bicasted and sent to both the server and to the receiving/destination user device. The server can decide whether to forward the original voice data (i.e., without alteration) or compensated voice data to the receiving/destination user device. In one embodiment, the server may provide a tag to differentiate the original voice data from the compensated voice data, or to further differentiate the compensated voice data produced by inserting noise, synthesizing using historical voice data, or restoring voice data loss/degradation with phoneme(s) or word(s) of the historical voice data. If the receiving/destination user device receives only one copy from either the server or the originating user device, that copy is stored in a jitter cancellation buffer of the codec (or a front end buffer). But if both copies are received, the receiving/destination user device determines whether they are different by, for example, examining a tag of the voice data. The receiving/destination user device may decide to keep one of the copies. If the copy from the server includes compensated voice data, the receiving/destination user device stores the copy in the jitter cancellation buffer.

Figure 4:
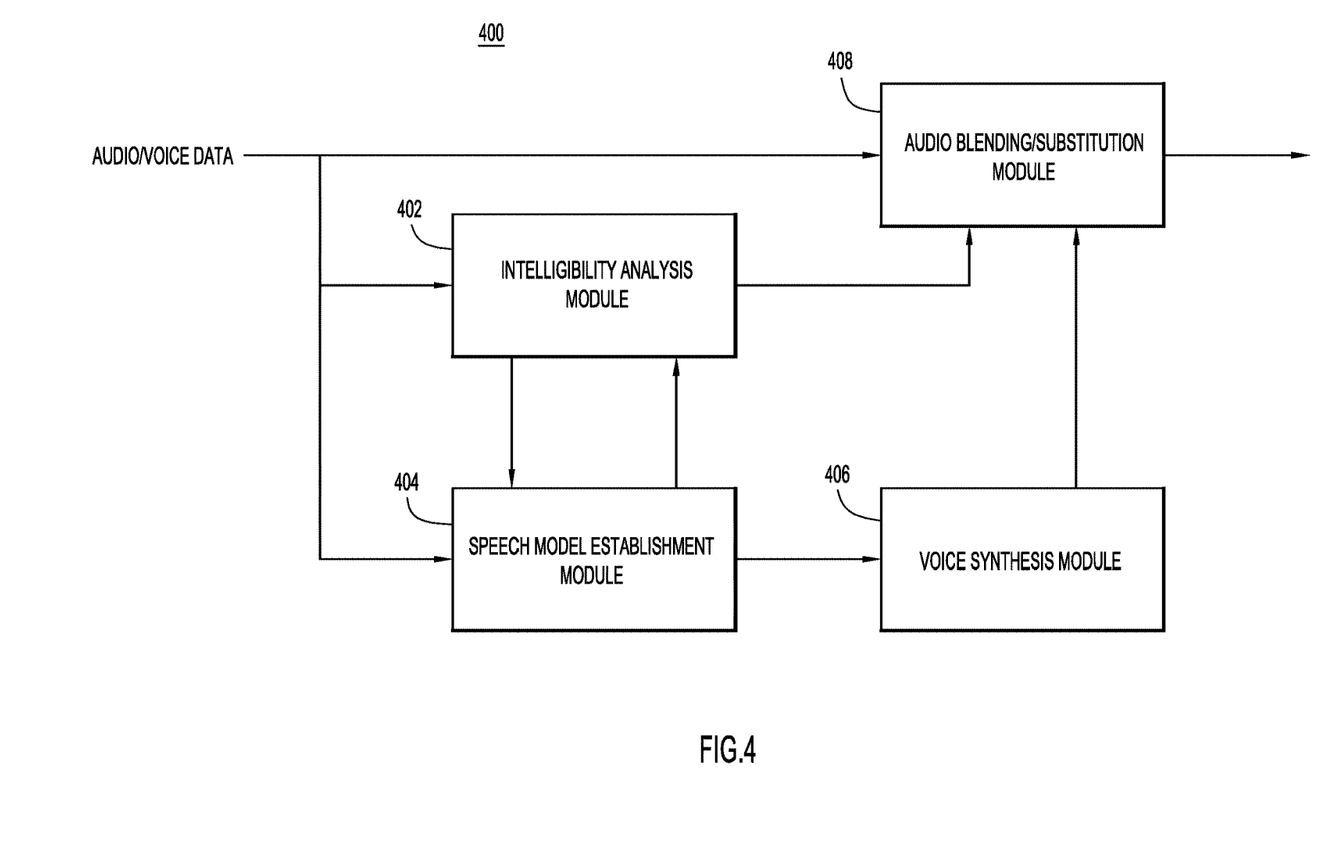
FIG. 4 is a high-level block diagram of processing functions of a voice data compensation process, according to an example embodiment.

FIG. 4 depicts a high-level block diagram of a processing functions of a voice data compensation process 400 according to an example embodiment. The voice data compensation process 400 may be executed by the server 102 or by a user device 106. For example, the voice data compensation process 400 may be implemented by a processor executing the voice data loss/degradation compensating logic 210/322 and speech module establishing logic 212/324. The voice data compensation process 400 includes an intelligibility analysis module 402, a speech model establishment module 404, a voice synthesis module 406, and an audio blending/substitution module 408. The intelligibility analysis module 402 is configured to analyze the intelligibility of received audio/voice data including detecting whether there is voice data loss/degradation in the received voice data, determine whether prediction probability of correctly compensating for a voice data loss/degradation is greater than a predetermined probability threshold, determine whether intelligibility of voice data is greater than an intelligibility threshold, etc. In performing its functions, the intelligibility analysis module 402 may employ a speech model of a particular speaker or a group of speaker provided by the speech model establishment module 404. Further, the intelligibility analysis module 402 may share its analysis results with the speech model establishment module 404 to enable the speech model establishment module 404 to establish speech modules. Moreover, the intelligibility analysis module 402 may forward its analysis results to the audio blending/substitution module 408 to assist the audio blending/substitution module 408 in producing compensated voice data.

The speech model establishment module 404 is supplied with the audio/voice data and is configured to use the voice data to establish speech modules for individual speakers or groups of speakers. The speech model establishment module 404 may construct a speech model to include a dictionary of phonemes and words used by a speaker or a group of speakers in conference sessions based on the inputted audio/voice data. A speech model may be based on the entire historical voice data or a latest period of time of a speaker or a group of speakers in a conference session. In one embodiment, the speech model establishment module 404 is configured to perform intelligibility analysis and semantic analysis to identify the underlying word or phoneme that was spoken or has caused a particular audio element to be generated, and the intelligibility of the generated audio element (to replace unintelligible voice data). The generation of the audio element can depend on contextual information, semantic and grammatical information, models of vocal production learned from the speaker. The speech model establishment module 404 may share the speech models with the intelligibility analysis module 402 to determine the intelligibility of the input audio/voice data, and with the voice synthesis module 406 to produce synthesized voice data.

The voice synthesis module 406 is configured to synthesize voice data based on phonemes or words uttered by a speaker or a group of speakers, i.e., historical voice data, and supply the synthesized voice data to the audio blending/substitution module 408.

The audio blending/substitution module 408 is configured to receive the input audio/voice data, intelligibility analysis from the intelligibility analysis module 402, and the synthesized voice data from voice synthesis module 406, to produce compensated voice data by inserting noise or synthesized voice data into the input audio/voice data, and output the compensated voice data. If the voice data compensation process 400 is executed in a server, the compensated voice data is transmitted to a receiving/destination user device. If the voice data compensation process 400 is executed in a user device, the compensated voice data is output to a voice data playback device, e.g., a speaker.

Figure 5:
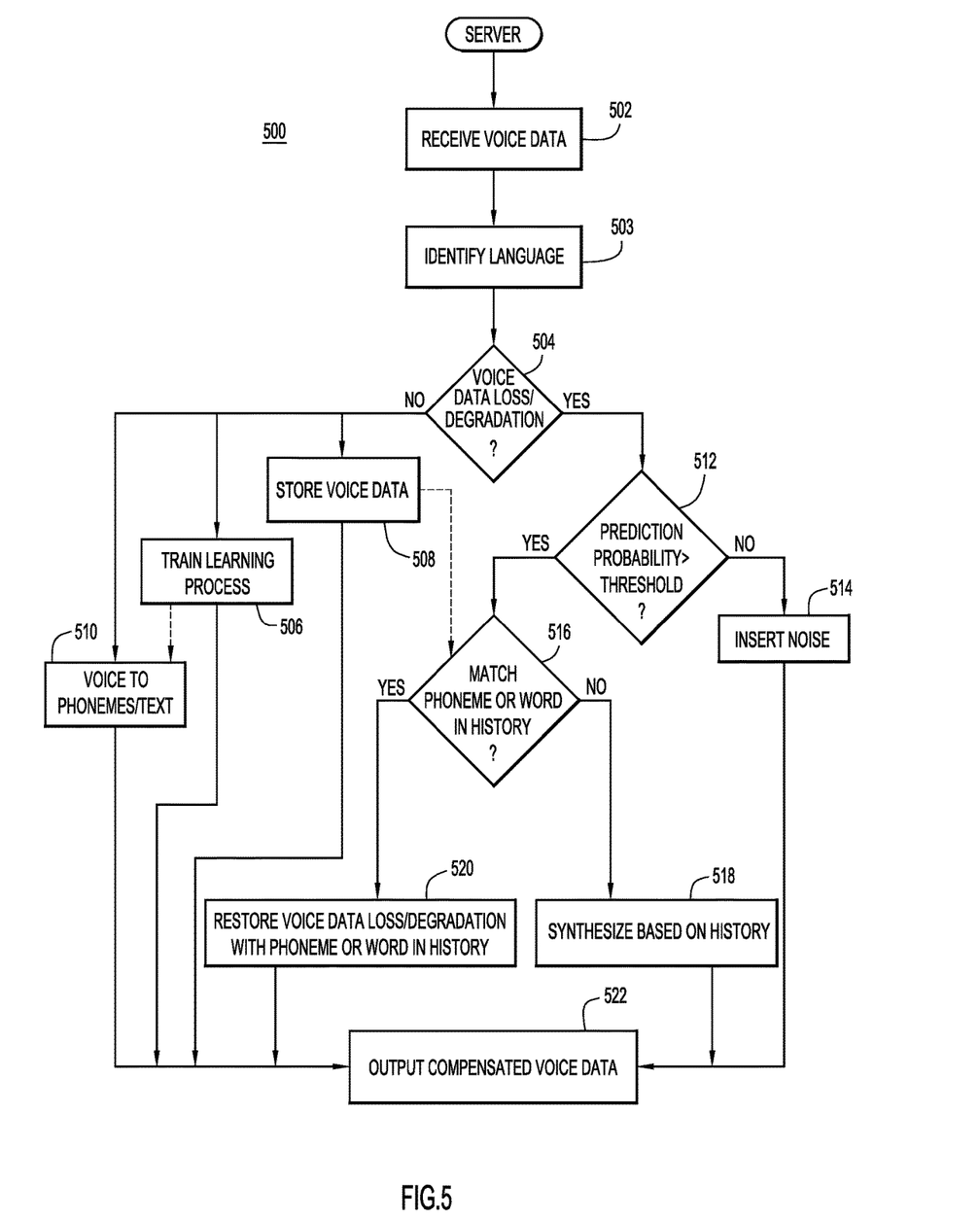
FIG. 5 is a flow chart of a method performed by a server for processing received voice data and producing compensated voice data for a communication session, according to an example embodiment.

FIG. 5 is a flow chart of a method 500 performed by a server, such as the server 102 (FIG. 1), for processing received audio/voice data and producing compensated voice data for a communication session, according to an example embodiment. The method 500 starts at 502 at which the server receives voice data. At 503, the server identifies the language spoken in the received voice data. At 504, the server determines whether there is voice data loss/degradation in the received voice data. If there is no voice data loss/degradation in the received voice data ("No" at 504), the server may perform one or more operations as described below. For example, at 506, the server may use the received voice data to train a learning process to establish a speech model for a user or a group of users in the communication session. The training may include building speech and vocabulary statistics and identifying the speaker participant(s) in the communication session. At 508, the server stores the received voice data in a memory, e.g., the memory 204 in FIG. 2. At 510, the server transcribes the voice data to phonemes/text. The speech model established at 506, the voice data stored at 508, and the transcription produced at 510 are collectively referred to as historical voice data.

If the server detects that there is voice data loss/degradation in the received voice data ("Yes" at 504), at 512 the server determines whether prediction probability of correctly compensating for the voice data loss/degradation is greater than a predetermined probability threshold. The server may use the speech model established at 506 to identify the speaker of the received voice data in determining the prediction probability. For example, the server may make a prediction of phoneme(s) or word(s) base on the historical voice data of the speaker of the received voice data, and determine whether the prediction probability of this predicted phoneme(s) or word(s) correctly compensating for the voice data loss/degradation is greater than a predetermined probability threshold.

If the prediction probability is not greater than the predetermined probability threshold, at 514 the server compensates for the voice data loss/degradation by inserting noise to the received voice data to produce first compensated voice data. If the prediction probability is greater than the predetermined probability threshold, at 516 the server determines whether the predicted phoneme(s) or word(s) for the voice data loss/degradation matches a phoneme or a word in the historical voice data, e.g., the historical voice data stored at 508. If there is no match, at 518 the server synthesizes voice data based on the historical voice data for the voice data loss/degradation and produces second compensated voice data. If the predicted phoneme(s) or word(s) matches a phoneme or a word in the historical voice data, at 520 the server restores the voice data loss/degradation with the phoneme or word in the historical voice data and produces third compensated voice data. At 522, the server outputs one of the first, second, or third compensated voice data produced at 514, 518, or 520 to one or more receiving/destination user devices.

Figure 6:
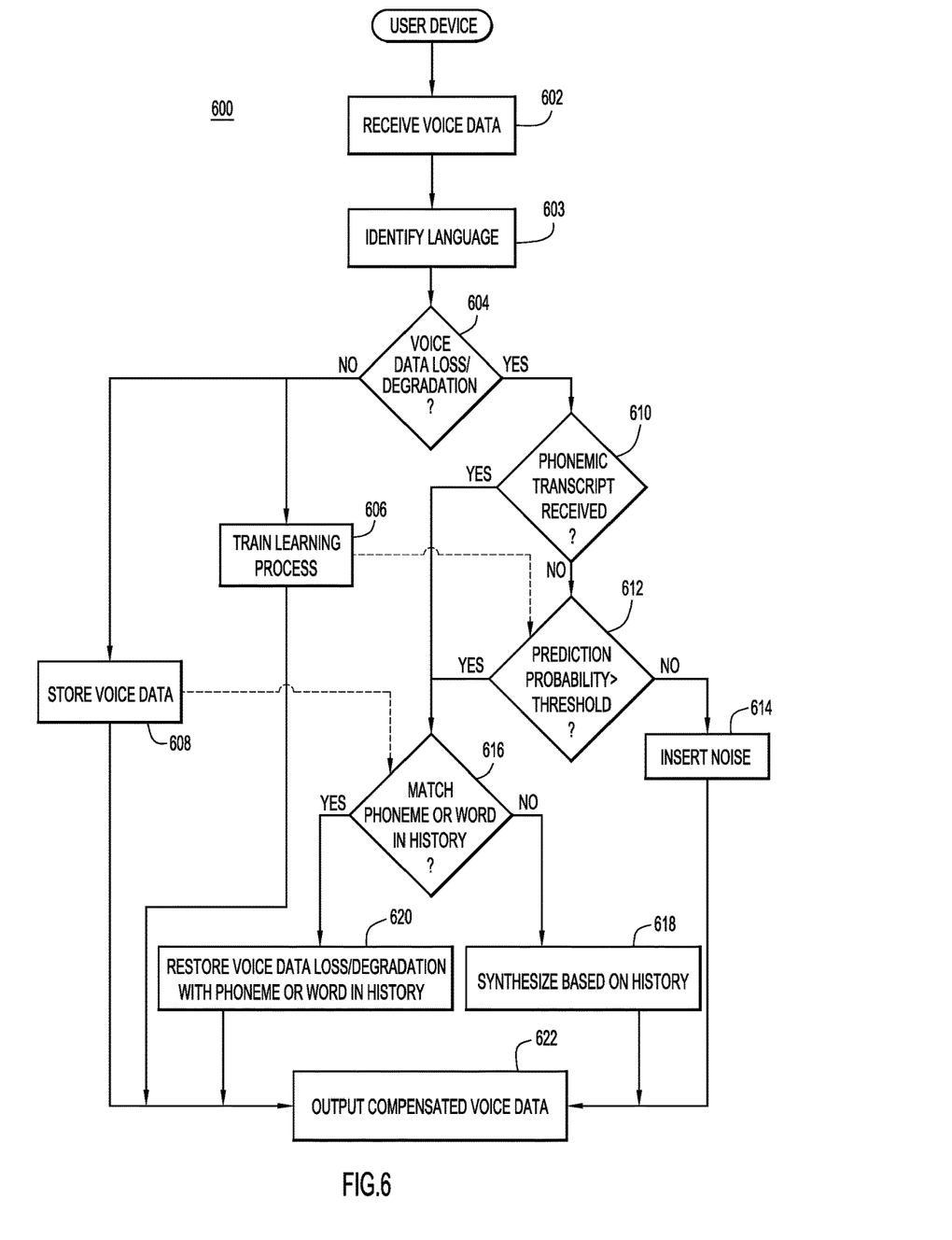
FIG. 6 is a flow chart of a method performed by a user device for processing received voice data and producing compensated voice data for a communication session, according to an example embodiment.

FIG. 6 is a flow chart of a method 600 performed by a user device, e.g., one of the user devices 106-1 to 106-4 (FIG. 1), for processing received audio/voice data and producing compensated voice data in a communication session. The method 600 starts at 602 at which the user device receives voice data. At 603, the user device identifies the language spoken in the received voice data. At 604, the user device determines whether there is voice data loss/degradation in the received voice data. If there is no voice data loss/degradation in the received voice data ("No" at 604), the user device may perform one or more operations as described below. For example, at 606, the user device may use the received voice data to train a learning process to establish a speech model for a user or a group of users in the communication session. The training may include building speech and vocabulary statistics and identifying the speaker participant(s) in the communication session. At 608, the user device stores the received voice data as part of historical voice data. The speech model established at 606 and the voice data stored at 608 are collectively referred to as historical voice data. If the user device detects that there is voice data loss/degradation in the received voice data ("Yes" at 604), at 610 the user device determines whether it receives a phonemic transcription for the received data from a server of the communication session. In some embodiments, the user device may convert the received voice data to phonemic transcription.

If the user device does not have a phonemic transcription for the received data ("No" at 610), at 612 the user device determines whether prediction probability of correctly compensating for the voice data loss/degradation is greater than a predetermined probability threshold. The user device may use the speech model established at 606 to identify the speaker of the received voice data in determining the prediction probability. For example, the user device may make a prediction of phoneme(s) or word(s) base on the historical voice data of the speaker of the received voice data, and determine whether prediction probability of this predicted phoneme(s) or word(s) correctly compensating for the voice data loss/degradation is greater than a predetermined probability threshold.

If the prediction probability is not greater than the predetermined probability threshold, at 614 the user device compensates for the voice data loss/degradation by inserting noise to the received voice data to produce fourth compensated voice data. If the user devices receives a phonemic transcription of the received voice data ("Yes" after 610) or the prediction probability is greater than the predetermined probability threshold ("Yes" after 612), at 616 the user device determines whether the predicted phoneme(s) or word(s) for the voice data loss/degradation matches a phoneme or a word in the historical voice data, e.g., the historical voice data stored at 608. If there is no match, at 618 the user device synthesizes voice data based on the historical voice data for the voice data loss/degradation and produces fifth compensated voice data. If the predicted phoneme(s) or word(s) matches a phoneme or a word in the historical voice data, at 620 the user device restores the voice data loss/degradation with the phoneme or the word in the historical voice data and produces sixth compensated voice data. At 622, the user device outputs one of the fourth, fifth, or sixth compensated voice data produced at 614, 618, or 620 to a speaker of the user device.

Figure 7:
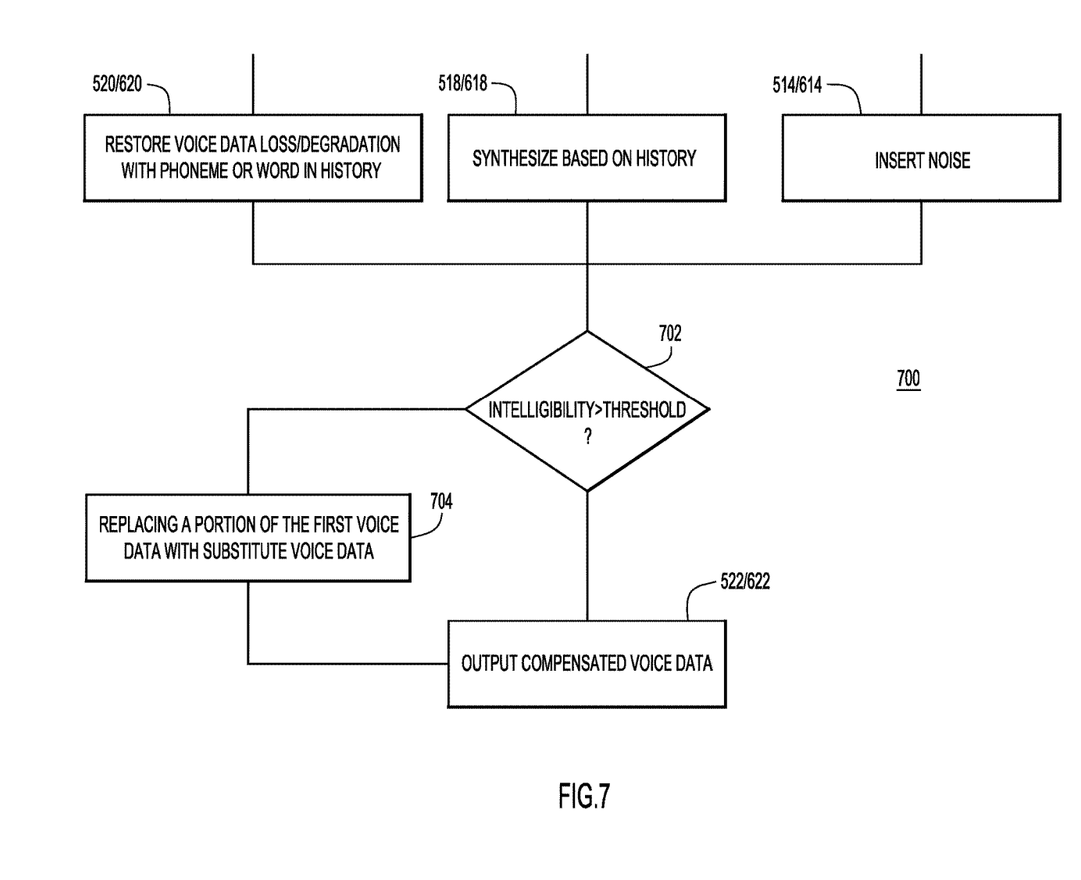
FIG. 7 is a flow chart illustrating a method by a server or a user device for improving intelligibility of voice data, according to an example embodiment.

In some embodiments, after the compensated voice data are produced at 514/614, 518/618, or 520/620 in FIGS. 5 and 6, but before being output, the server or user device may further determine whether the voice data are intelligible. FIG. 7 is a flow chart illustrating a method 700 performed by a server or user device for improving intelligibility of voice data. At 702, the server or user device determines whether intelligibility of the compensated voice data is greater than an intelligibility threshold. If the intelligibility of the compensated voice data is greater than the intelligibility threshold, the server or user device releases the compensated voice data to be outputted as described in 522/622 in FIGS. 5 and 6. However, if the intelligibility of the voice data is not greater than the intelligibility threshold, at 704 the server or user device replaces at least a portion of the compensated voice data with substitute voice data.

For example, the server or user device may maintain a database storing idealized voice data (phonemes or words). The server or user device may compare the compensated voice data with the idealized voice data to rate the compensated voice data. If the rating of the compensated voice data is greater than an intelligibility threshold, the server or user device releases the compensated voice data. If the rating of the compensated voice data is not greater than an intelligibility threshold, the server or user device replaces a portion of the compensated voice data with substitute voice data to improve its intelligibility. For example, the substitute voice data includes one of a comparable counterpart of the historical voice data corresponding to the portion of the compensated voice data, synthesized voice data based on the historical voice data, the idealized voice data, or a combination thereof. The revised voice data with the substitute voice data is output at 522/622 in FIGS. 5 and 6.

According to embodiments of this disclosure, the next predicted phoneme can be inferred "on-the-fly" during the audio communication session, e.g., while a speaker is talking, and compared to the actual phoneme being pronounced, to contribute to the continuous learning of the speaker's speech. In case of a dropout, the next phoneme or word fails to arrive in time from the speaker. A predicted phoneme or word can be injected into the received voice data to produce compensated voice data. In one embodiment, the server or user device may also consider a recognized but poorly spoken phoneme and fix the unclear phoneme to make it more understandable by the listener.

The techniques presented herein introduce a minimum latency to perform prediction and produce compensated voice data. Thus, the server or user device is provided with a fast-access vocabulary from which the most probable next phoneme or word can be inferred by a very simple runtime operation. For example, techniques disclosed herein are operable to replace missing phonemes when a probability of correctly compensating for the missing phonemes is determined to be greater than a threshold, which avoids many cases of mis-prediction while still improving the overall intelligibility. In one embodiment, techniques disclosed herein can reduce latencies to an order of milliseconds, for example below 100 ms. When voice data loss/degradation occurs on the server, the server can rapidly generate an alternate/compensated voice data. Identifying a speaker and the speaker's speech model, including frequently-used vocabulary, can reduce the time needed to produce compensated voice data. In one embodiment, the server does not have to wait for the end of a vowel to start sending predicted phoneme(s) or word(s).

The embodiments of this disclosure contemplate identifying a speaker or a group of speakers of voice data to produce compensated voice data. In one embodiment, compensated voice data may be generated from a vocabulary of words and figures of speech of a group of speakers. Thus, a missing phoneme(s) or word(s) may be predicted using historical voice data of a group of speaker in a communication session.

In one embodiment, the compensated voice data are produced in a manner to mimic a speaker's voice by attempting to match original timbre (at minimal male/female voice) or re-using a predicted phoneme already spoken in a previous part of the conversation. The phoneme(s) may also be obtained from a stored recording of the user's voice.

In another embodiment, when the received voice data include a plurality of voice dropouts, the server or user device may introduces a delay in outputting compensated voice data, enabling the prediction system to benefit from leaning a small amount of post-dropout audio context in order to increase the prediction ability of the system.

Because a server generally has higher computing and storage capabilities, on the server side, a relatively long history of audio/voice data is kept, e.g., history of a plurality of prior sessions. The learning machine of the server is continuously trained with new audio input. The server may send detected phonemes to the receiver (user device) and used to provide indexing of the audio history.

When audio loss/degradation is detected, the server attempts to predict the missing phonemes or words, through the assistance of the learning process/machine. When the server determines that prediction probability of correctly compensating for the voice data loss/degradation is greater than a predetermined probability threshold, the server restores the audio loss/degradation either from the indexed audio history or through synthesis. On the other hand, if prediction probability of correctly compensating for the voice data loss/degradation is not greater than a predetermined probability threshold, then the server uses dropout cancellation, such as pink noise insertion, to produce compensated voice data.

Because a user device generally has lower computing and storage capabilities, on the user device side, a smaller history of audio/voice data is kept, e.g., a current or the latest prior session history. If phonemic transcription is received from the server, this transcription can be used to provide indexing information for the audio audio/voice data. The user device is also provided with a learning process/machine capability.

When audio loss/degradation between the server and the user device is detected, the user device determines whether it has received the phonemic transcription of the voice data from the server. If the transcription has been received, the user device does not have to predict the missing phoneme and can directly proceed to produce compensated voice data. Otherwise, if the phonemic transcription has not been received, the user device predicts and restores the missing phonemes, through a similar process as the one on the server side. Finally, the restored audio stream is played back.

The embodiments disclosed herein use a learning process/machine to capture speech experience of a user or a group of users so as to establish a vocabulary and to assist in predicting the most probable missing phonemes in a communication session. The learning process recognizes voice patterns and figures of speech, and can predict what the probably next speech element or in between speech elements is. The learning process can be trained during a conference session, and retain more knowledge for a given user participating in more sessions. The server or user device generates the missing voice elements and inserts them live or in a recording. The server or user device may also examine an existing recording to clean it up for better understanding during playback. During a non-interactive presentation, the server or user device can employ the spoken phonemes prior to and following a voice dropout to provide compensated voice data for the dropout, providing a better user experience. The server or user device may also use the meeting materials like slide presentations or documents to provide compensated voice data.

The embodiments disclosed herein utilize computer-based language processing techniques to provide loss-concealment during a voice conversation, e.g., VoW communication session, and to increase speech intelligibility in case of small audio loss/degradation, increasing the value of a communication session. The methods and devices disclosed herein enable concealment of audio losses which could occur either on the sender to server transmission, or on the server to receiver transmission. The disclosed methods also employ cloud computing power to reduce the processing load on the receiving/destination user device, by performing more operations on the server side, including audio history indexing, phonemic transcription, etc.

In one embodiment, with a model of voice production for the speaker and an assessment of intelligibility, a voice production model can be utilized to synthesize a more idealized or improved voice data. The synthesized voice data can be blended into the original audio/voice data.

Techniques disclosed herein enhance speech communications by identifying and replacing unintelligible elements with more intelligible but recognizably similar versions. The example methods use machine learning techniques to model a user's speech production and replicate sounds using a modified model with higher intelligibility. In one embodiment, by focusing on semantic analysis with machine learning techniques, audio which is likely to be difficult to understand, is changed/compensated.

In some embodiments, the voice compensation techniques disclosed herein can be applied to other voice applications. For example, the compensation techniques can be employed in a headset worn by a listener. The headset can detect voice data loss/degradation and provide voice compensation to improve the intelligibility of the voice data, either when the listener is facing the speaker or when the listener is farther away in a conference room. As another example, the voice compensation techniques can be performed between a talker and a loudspeaker from which amplified voice audio is projected to ensure that the amplified and projected voice audio is intelligible. The server may be aware of the text of the talker's speech and use that as a basis for voice improvement, even if the talker may improvise during the speech.

In summary, in one aspect, a method is provided, which includes: obtaining, by an apparatus, first voice data from a first user device associated with a first speaker participant in a communication session; detecting voice data loss or degradation in the first voice data; determining whether prediction probability of correctly compensating for the voice data loss or degradation is greater than a predetermined probability threshold; if the prediction probability is greater than the predetermined probability threshold, first compensating for the voice data loss or degradation using historical voice data received by the apparatus prior to receiving of the first voice data, the first compensating producing first compensated voice data; if the prediction probability is not greater than the predetermined probability threshold, second compensating for the voice data loss or degradation by inserting noise to the first voice data to produce second compensated voice data; and outputting the first compensated voice data or the second compensated voice data.

In another aspect, an apparatus is provided. The apparatus includes a communication interface that enables network communications, a processor, and a memory to store data and instructions executable by the processor. The processor is configured to execute the instructions to: obtain from a first user device associated with a speaker participant in a communication session; detect voice data loss or degradation in first voice data of the audio; determine whether prediction probability of correctly compensating for the voice data loss or degradation is greater than a predetermined probability threshold; if the prediction probability is greater than the predetermined probability threshold, first compensate for the voice data loss or degradation using historical voice data received by the apparatus prior to receiving of the first voice data, to produce first compensated voice data; if the prediction probability is not greater than the predetermined probability threshold, second compensate for the voice data loss or degradation by inserting noise to the first voice data to produce second compensated voice data; and output the first compensated voice data or the second compensated voice data.

In another aspect, one or more non-transitory computer-readable storage media are provided. The one or more non-transitory computer-readable storage media are encoded with software comprising computer executable instructions which, when executed by a processor of an apparatus, cause the processor to: obtain voice data from a first user device associated with a speaker participant in a communication session; detect voice data loss or degradation in first voice data of the audio; determine whether prediction probability of correctly compensating for the voice data loss or degradation is greater than a predetermined probability threshold; if the prediction probability is greater than the predetermined probability threshold, first compensate for the voice data loss or degradation using historical voice data received by the apparatus prior to receiving the first voice data, to produce first compensated voice data; if the prediction probability is not greater than the predetermined probability threshold, second compensate for the voice data loss or degradation by inserting noise to the first voice data to produce second compensated voice data; and output the first compensated voice data or the second compensated voice data.

The above description is intended by way of example only. Various modifications and structural changes may be made therein without departing from the scope of the concepts described herein and within the scope and range of equivalents of the claims.

What is claimed is:
1. A method comprising:
obtaining, by an apparatus, first voice data from a first user device associated with a first speaker participant in a communication session;
detecting voice data loss or degradation in the first voice data;
determining whether prediction probability of correctly compensating for the voice data loss or degradation is greater than a predetermined probability threshold;
if the prediction probability is greater than the predetermined probability threshold, first compensating for the voice data loss or degradation using historical voice data received by the apparatus prior to receiving of the first voice data, the first compensating producing first compensated voice data;

if the prediction probability is not greater than the predetermined probability threshold, second compensating for the voice data loss or degradation by inserting noise to the first voice data to produce second compensated voice data; and outputting the first compensated voice data or the second compensated voice data so as to improve intelligibility of the first voice data to a user.

2. The method of claim 1, further comprising:

detecting second voice data that has no voice data loss or degradation;

storing the second voice data as the historical voice data; and training a learning process with the historical voice data to establish a speech model for a speaker participant of the second voice data.

3. The method of claim 2, wherein the first compensating comprises:

determining whether the voice data loss or degradation in the first voice data matches a phoneme or a word in the historical voice data;

if the voice data loss or degradation in the first voice data matches a phoneme or a word in the historical voice data, restoring the voice data loss or degradation with the phoneme or the word in the historical voice data; and if the voice data loss or degradation in the first voice data does not match a phoneme or a word in the historical voice data, synthesizing voice data based on the historical voice data for the voice data loss or degradation.

4. The method of claim 1, further comprising:

identifying the first speaker participant of the first voice data; and identifying a first portion of the historical voice data related to the first speaker participant for compensating the voice data loss or degradation based on the identification of the first speaker participant.

5. The method of claim 4, further comprising:

identifying a second speaker participant associated with the first speaker participant; and identifying a second portion of the historical voice data related to the second speaker participant for compensating the voice data loss or degradation based on the identification of the second speaker participant.

6. The method of claim 1, before outputting the first compensated voice data or the second compensated voice data, the method further comprising:

determining whether intelligibility of the first voice data is greater than an intelligibility threshold; and if the intelligibility of the first voice data is not greater than the intelligibility threshold, replacing a portion of the first voice data with substitute voice data.

7. The method of claim 6, wherein the substitute voice data includes one of a comparable counterpart of the historical voice data corresponding to the portion of the first voice data, a synthesis voice data based on the historical voice data, or idealized voice data.

8. The method of claim 1, wherein if the apparatus is a server, the outputting outputs the first compensated voice data or the second compensated voice data to a second user device associated with a listening participant in the communication session; and if the apparatus is a second user device associated with a listening participant in the communication session, the outputting outputs the first compensated voice data or the second compensated voice data to a voice data playback device.

9. An apparatus comprising:

a communication interface that enables network communications;

a processor; and a memory to store data and instructions executable by the processor, wherein the processor is configured to execute the instructions to:

obtain from a first user device associated with a speaker participant in a communication session;

detect voice data loss or degradation in first voice data of the audio;

determine whether prediction probability of correctly compensating for the voice data loss or degradation is greater than a predetermined probability threshold;

if the prediction probability is greater than the predetermined probability threshold, first compensate for the voice data loss or degradation using historical voice data received by the apparatus prior to receiving of the first voice data, to produce first compensated voice data;

if the prediction probability is not greater than the predetermined probability threshold, second compensate for the voice data loss or degradation by inserting noise to the first voice data to produce second compensated voice data; and output the first compensated voice data or the second compensated voice data so as to improve intelligibility of the first voice data to a user.

10. The apparatus of claim 9, wherein the processor is configured to:

detect second voice data that has no voice data loss or degradation;

store the second voice data as the historical voice data; and train a learning process with the historical voice data to establish a speech model for a speaker participant of the second voice data.

11. The apparatus of claim 10, wherein the processor is configured to:

determine whether the voice data loss or degradation in the first voice data matches a phoneme or a word in the historical voice data;

if the voice data loss or degradation in the first voice data matches a phoneme or a word in the historical voice data, restore the voice data loss or degradation with the phoneme or the word in the historical voice data; and if the voice data loss or degradation in first voice data does not match a phoneme or a word in the historical voice data, synthesize voice data based on the historical voice data for the voice data loss or degradation.

12. The apparatus of claim 9, wherein the processor is configured to:

identify the first speaker participant of the first voice data; and identify a first portion of the historical voice data related to the first speaker participant for compensating the voice data loss or degradation based on the identification of the first speaker participant.

13. The apparatus of claim 12, wherein the processor is configured to:

identify a second speaker participant associated with the first speaker participant; and identify a second portion of the historical voice data related to the second speaker participant for compensating the voice data loss or degradation based on the identification of the second speaker participant.

14. The apparatus of claim 13, wherein the processor is configured to identify the first speaker participant and the second speaker participant based on data related to the communication session that includes the first speaker participant and the second speaker participant.

15. The apparatus of claim 9, wherein before outputting first compensated voice data or the second compensated voice data, the processor is configured to:
  determine whether intelligibility of the first voice data is greater than an intelligibility threshold; and
  if the intelligibility of the first voice data is not greater than the intelligibility threshold, replace a portion of the first voice data with substitute voice data.

16. The apparatus of claim 15, wherein the substitute voice data includes one of a comparable counterpart of the historical voice data corresponding to the portion of the first voice data, a synthesis voice data based on the historical voice data, or idealized voice data.

17. One or more non-transitory computer-readable storage media encoded with software comprising computer executable instructions which, when executed by a processor of an apparatus, cause the processor to:
  obtain voice data from a first user device associated with a speaker participant in a communication session;
  detect voice data loss or degradation in first voice data of the audio;
  determine whether prediction probability of correctly compensating for the voice data loss or degradation is greater than a predetermined probability threshold;
  if the prediction probability is greater than the predetermined probability threshold, first compensate for the voice data loss or degradation using historical voice data received by the apparatus prior to receiving the first voice data, to produce first compensated voice data;
  if the prediction probability is not greater than the predetermined probability threshold, second compensate for the voice data loss or degradation by inserting noise to the first voice data to produce second compensated voice data; and
  output the first compensated voice data or the second compensated voice data so as to improve intelligibility of the first voice data to a user.

18. The one or more non-transitory computer-readable storage media of claim 17, wherein the instructions further cause the processor to:
  determine whether the voice data loss or degradation in the first voice data matches a phoneme or a word in the historical voice data;
  if the voice data loss or degradation in the first voice data matches a phoneme or a word in the historical voice data, restore the voice data loss or degradation with the phoneme or the word in the historical voice data; and
  if the voice data loss or degradation in first voice data does not match a phoneme or a word in the historical voice data, synthesize voice data based on the historical voice data for the voice data loss or degradation.

19. The one or more non-transitory computer-readable storage media of claim 17, wherein the instructions further cause the processor to:
  identify the first speaker participant of the first voice data; and
  identify a first portion of the historical voice data related to the first speaker participant for compensating the voice data loss or degradation based on the identification of the first speaker participant.

20. The one or more non-transitory computer-readable storage media of claim 19, wherein the instructions further cause the processor to:
  identify a second speaker participant associated with the first speaker participant; and
  identify a second portion of the historical voice data related to the second speaker participant for compensating the voice data loss or degradation based on the identification of the second speaker participant.

* * * * *